June 28, 1966  A. L. SILVERSTEIN  3,258,303
BINOCULAR VISION TRAINING AND TESTING INSTRUMENT HAVING
INTERCONNECTED ROTATABLE REFLECTOR AND TARGET MEANS
Filed Oct. 16, 1962  2 Sheets-Sheet 1

ARNOLD L. SILVERSTEIN
INVENTOR.

BY Daniel H. Bobis
atty

June 28, 1966 A. L. SILVERSTEIN 3,258,303
BINOCULAR VISION TRAINING AND TESTING INSTRUMENT HAVING
INTERCONNECTED ROTATABLE REFLECTOR AND TARGET MEANS
Filed Oct. 16, 1962 2 Sheets-Sheet 2
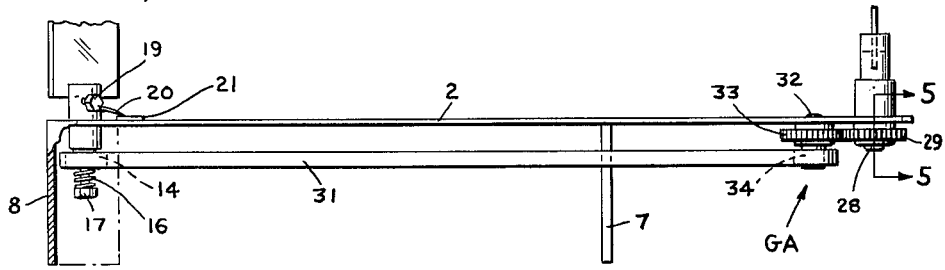
FIG. 3
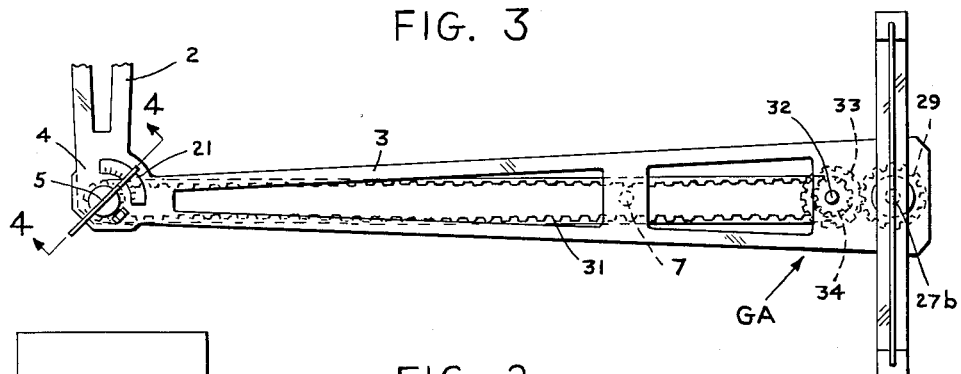
FIG. 2
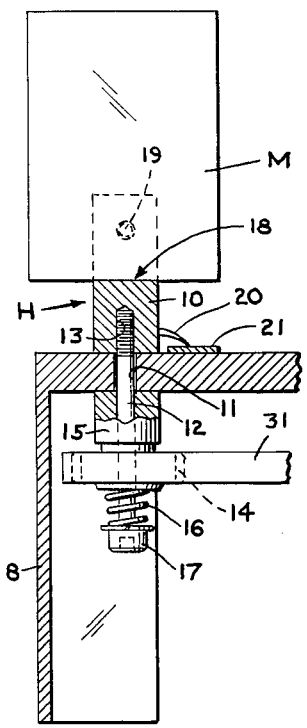
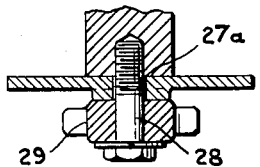
FIG. 5
FIG. 4
ARNOLD L. SILVERSTEIN
INVENTOR.
BY Daniel R. Bobis
Atty United States Patent Office 3,258,303
Patented June 28, 1966

3,258,303
BINOCULAR VISION TRAINING AND TESTING
INSTRUMENT HAVING INTERCONNECTED ROTATABLE REFLECTOR AND TARGET MEANS
Arnold L. Silverstein, 175 W. 76th St.,
New York 23, N.Y.
Filed Oct. 16, 1962, Ser. No. 230,979
2 Claims. (Cl. 351—2)

This invention relates generally to ophthalmic equipment and more particularly to an ophthalmic training and testing instrument utilizing the principles of a stereoscope. It is a continuation in part of my prior copending application Serial No. 23,505, filed April 20, 1960 now abandoned.

As was pointed out in my co-pending application there are many defects in vision which can be corrected by properly training the eyes.

In vision training, which is a prolonged process, two results are sought; first, the sensorial relationships are made normal and, second, the activities of the muscles of the respective eyes which subserve fusion, convergence, divergence and accommodation are coordinated to produce correct imagery.

Vision training is usually done by means of a training device having complimentary targets. The type targets utilized and the size of these targets therefor are an important factor in such vision training process. Each training instrument must be adapted to utilize these targets and, equally important, must be able to present these targets for viewing in as natural a condition as possible for the person receiving the vision training to meet the desired results.

Heretofore the ophthalmic training instruments adapted for this purpose were expensive devices and therefore could only be part of an optometrist's or ophthalmologist's office equipment. It was not feasible to provide an instrument for each individual which could be utilized for home training and in many instances because of the complexity and size of the ophthalmic training instruments heretofore available many offices did not utilize this equipment at all nor could they make it available to persons who required such vision training.

In my co-pending application Serial No. 23,505 an attempt was made to provide one form of inexpensive device for a vision training specialist to utilize either as office equipment or as a training instrument for use in the home of a person requiring vision correction.

It was found however that this device was relatively crude because in operation the respective images for the right and left eyes failed to remain in parallel planes and accordingly the first fundamental results above set forth, namely that of maintaining the sensorial relationships normal, could not be obtained.

The present invention overcomes this difficulty as well as the difficulties of the prior art devices and still provides relatively inexpensive equipment for vision training.

Thus, in the present invention a portable vision training instrument is provided wherein a rotatable mirror is positioned at the apex of a pair of intersecting arms disposed at right angles to each other and having targets thereon at a predetermined distance from the apex, which targets are operatively associated with the mirror so that whichever of the respective targets is being viewed through the mirror that target will be simultaneously rotated in a given ratio relative the rotation of the mirror; the mirror and the targets being mechanisms by which a normal sensorial relationship is established and the eye muscles worked to meet and correct the specific visual defects requiring correction; and the targets are disposed so that large targets can be utilized and viewed "in space" by the person whose vision is being corrected in the sense that the targets are actually where they are perceived; and the entire assembly is constructed to permit easy performance of the "cover test" in observation of the movements in general, and easy introduction of any practical amount of horizontal and vertical prism power, the patient's interpupillary distance notwithstanding.

Accordingly, it is an object of the present invention to provide a cheap vision training and correcting instrument adapted to be utilized in the home of a patient or in the office of a vision training specialist which instrument is relatively easy to operate.

Further objects and advantages of the invention will become evident from the following description with reference to the accompanying drawings, in which:

FIGURE 2 is a top view of one arm showing a preferred means for rotating the target with rotation of the mirror.

FIGURE 3 is a side view partially in section showing one arm with the rotating means for the target.

FIGURE 4 is a view taken on 4—4 of FIGURE 2.

FIGURE 5 is a view taken on 5—5 of FIGURE 3.

Figure 1:
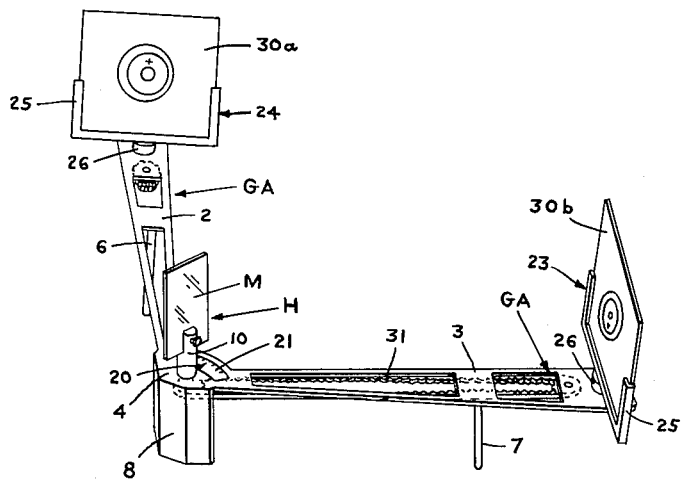
FIGURE 1 is a perspective view of the device.
Figure 6:
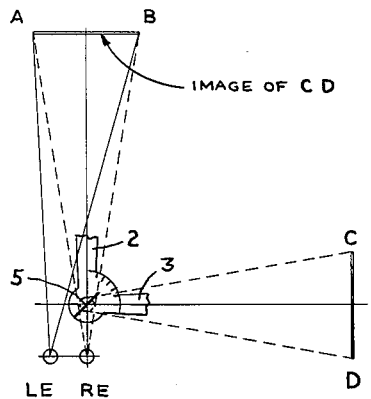
FIGURE 6 is a diagrammatic illustration of the optical effect of the device when it is at the zero position.

Referring to the drawings, FIGURES 1 and 2 show a frame generally designated 1 including arms 2 and 3 disposed at right angles to each other and connected as at 4 to form a point of intersection diagrammatically designated as 5 in FIGURES 2 and 6 of the drawings.

The arms are substantially flat members supported in the same horizontal plane by spaced legs 6 and 7 disposed approximately midway down each of the respective arms so as to coact with a center post or support 8 adjacent the point where the arms connect and which support and legs 6 and 7 are perpendicular to the horizontal plane of the arms and together form a triangular shaped support means to hold the arms in a fixed position from the surface on which the vision training instrument is placed.

Extending through the connecting portion of the arms 2 and 3 in the vertical line of the point of intersection 5 a rotatable holder generally designated H is provided for supporting a mirror M therein.

The rotatable holder H includes a cylindrical member 10 centered over an opening 11 concentric to the point of intersection 5 so that a pivot shaft 12 may be extended up through the opening 11 and connected in a threaded bore 13 in the cylindrical member 10. As shown in FIGURES 2, 3 and 4 a drive gear 14 is fixedly connected to the pivot shaft 12 and held a spaced distance from the connecting portion 5 of the arms by means of a spacer 15 so that the rotation of the holder and hence the pivot shaft will be transmitted to the driven gear 14 and the gear will rotate in a fixed plane when this occurs.

A spring 16 is mounted about the pivot shaft between the head 17 of the pivot shaft and the side of the drive gear 14 remote from the spacer 15 so that the pivot shaft can be threaded into the cylindrical member and the tension between these parts adjusted by increasing or decreasing the compression of the spring 16.

As was pointed out in my prior co-pending application Serial No. 23,505 the holder assembly H for the mirror must be disposed not greater than 9″ of arc from perpendicular alignment with respect to the horizontal plane of the arms, if proper operation of the present device is to be obtained.

Furthermore, FIGURES 3 and 4 show that the cylindrical member 10 is slotted as at 18 to receive the mirror M which slot is also in a plane perpendicular to the plane of the intersecting arms 2 and 3 and thus the mirror M is disposed in a plane which may be rotated through a wide arc from either side of the zero point which lies 45° from the longitudinal axis of the respective arms 2 and 3.

A set screw 19 in the cylindrical holder extends through to the slotted portion and acts to hold the mirror in assembled position.

A pointer 20 is attached to the cylinder 10 in alignment with the centerline of the slot 18 so that the relative angular change of the mirror can be determined as it is rotated from the zero position during operation. An accurate scale 21 spaced from the point of intersection coacts with the pointer for accurately determining this change of angular position from the zero position. The importance of the scale will become apparent in connection with the description of the operation of the present device.

As above described the holder assembly H and the mirror M are so mounted that they can be rotated which action in turn rotates the pivot shaft 12 and the drive gear 14 connected thereto.

It is through this construction that the mirror is operatively connected to one or the other of the respective right and left hand target assemblies 23 and 24 rotatably mounted along the centerlines of their associated arms 2 and 3 at positions thereon approximately 14.5″ from the point of intersection 5 where the centerline of the respective arms 2 and 3 intersect.

Target holder assemblies

FIGURES 1, 2 and 3 show that each target holder assembly includes a U-shaped target holder 25 which has a centrally disposed boss 26 centered over an opening 27a on arm 2 and 27b on arm 3 disposed in the centerline or longitudinal axis of the arm and having its center the desired 14.5″ from the point of intersection 5 of the centerline of the arms so that when a quill shaft 28 is connected to the boss 26 and disposed through the opening the target holder assemblies 23 and 24 can be rotated by driven gears 29 which are fixedly mounted to the quill shafts 28 of these respective assemblies.

The U-shaped target holder 25 of each assembly is disposed in a plane perpendicular to the horizontal plane of its associated arm so that in the zero position of the mirror the vertical planes of the respective targets generally designated 30a and 30b mounted in the respective right and left target holders 25 if extended would be at right angles to each other and form with the arms a substantially square geometry and thus provide the zero point for the mirror as above defined.

Each driven gear 29 for its associated target holder assembly coacts with a 2 to 1 ratio gear assembly generally designated GA so that a resilient type cog belt 31 connected between the drive gear 14 and the gear assembly to be actuated will on movement of the mirror M actuate the associated target holder assembly 23 or 24 as the case may be to rotate through twice the number of degrees of rotation that the holder assembly or mirror have been rotated.

The gear assembly GA for each of the target holder assemblies includes a shaft 32 rotatably mounted to the arm on which the gear assembly is assembled and an upper gear 33 and lower gear 34 as is clearly shown in FIGURES 2 and 3 of the drawings. The shaft is so mounted on its associated arm that the shaft is spaced from the axis of rotation for the quill shaft 28 of the respective target holder to permit the upper gear of each gear assembly to mesh and rotate the driven gear 29 of the associated target holder assembly 23 or 24. Conversely the lower gear is in alignment with the drive gear 14 to permit the cog belt 31 to be affixed about these gears so that the drive gear will rotate the respective driven gears of the target holder assembly to which it is connected and as indicated above this will be the target holder assembly which is being viewed through the mirror by the person receiving the vision training.

The targets

The structure above described depends also on the actual targets which are utilized for the vision training process.

Such targets are known in the art and can be divided into categories on the basis of their function. Thus at least one or more of the following type targets can be used in this vision training instrument:

(1) Targets which test and train simultaneous binocular perception.

(2) Targets which test and train fusion alone in the central "reaches" on the visual field.

(3) Targets which test and train fusion in the central "reaches" of the visual field using stereopsis in the more peripheral reaches of the visual field.

(4) Targets which test and train stereopsis in the central "reaches" of the visual field.

(5) Targets which test and train ductions.

(6) Targets which test the horizontal phorias.

(7) Targets which test the extent of horizontal fixation disparity quantitatively.

(8) Targets which test and train retinal rivalry.

Operation

The operation of the above described instrument commences initially with the mirror in the zero position and the targets selected in position in the target holders 25 of the target holder assemblies in vertical planes perpendicular to the centerline or longitudinal axis of the arms and perpendicular to each other.

When in this position the instrument can be used both for testing and for the vision training of the patient by the simple process of rotating the mirror any given number of degrees from the zero position either clockwise or counterclockwise, depending on the particular type of vision training being conducted.

The targets may be similar in appearance or entirely unrelated to each other in appearance depending on which type targets are utilized and these targets can of course be utilized interchangeably in the respective target holders as may be required for the particular person being tested or trained. As a corollary to this, the operation of the instrument will correspond to the type of targets selected.

Figure 8:
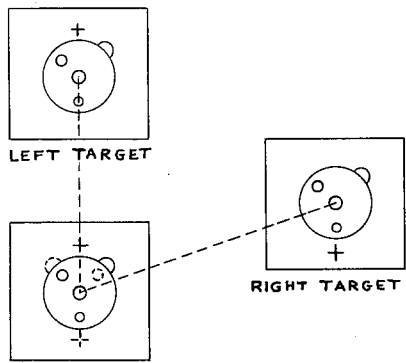
FIGURE 8 illustrates one set of targets for use in the device illustrated herein.

For purposes of illustration, to show one method of operating the above described structure, let us assume that a set of targets as shown in FIGURE 8 are inserted in the target holders. The target mounted in the right target holder assembly will hereinafter be referred to as the right target and that in the left target holder assembly as the left target.

Since the mirror can be positioned so that its back either faces the right target or the left target for the purpose of the present description we will assume that the mirror is so positioned that its back faces the left target. In this position the patient disposes his eyes in a plane parallel to the left target and places his nose on the lefthand side of the mirror and thus he views the left target with his left eye directly and the right target as it is imaged in the mirror.

With the mirror in the so-called zero position as above defined the optical effect of this result is illustrated in FIGURE 6 of the drawings. The image of CD will lie in the same planar space as that directly viewed on target AB and the patient in order to achieve the desired percept would use the same amount of convergence which he would use while looking at the target AB with both eyes directly.

The mirror can now be rotated clockwise or counterclockwise which would result in the image CD no longer occupying the same position in space as the target AB.

As a result in order to obtain the desired percept the patient would now have to converge or diverge relative to the convergence level which pertained when the mirror was in the zero position.

Using the pair of targets illustrated in FIGURE 8, one can test and train ductions. And with the illustrated set of targets the mirror can be rotated to an angular position relative the zero point where the eyes will not accommodate to produce this result. The object of this set of targets would in this case of convergence seek to improve the vision by increasing the angular position to which the eye will accommodate.

The advantage of the present construction over that of the prior art device consists in the fact that the image of CD is at all times in a plane parallel to that of the directly viewed target AB.

In the prior art device, because there was no coaction between the movement of the mirror and the movement of the target being viewed through the mirror, once the mirror was rotated the image of the target seen in the mirror was no longer in a plane parallel to that of the directly viewed target and, as a result, the normal sensorial relationship could not be obtained.

Figure 7:
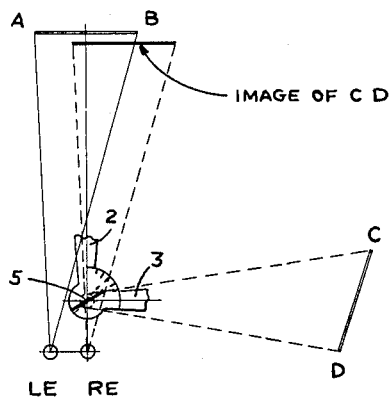
FIGURE 7 is a diagrammatic illustration of the optical effect of the device when the mirror has been moved through a predetermined number of arcuate degrees.

FIGURE 7 illustrates the effect of rotating the mirror in the present construction through a predetermined number of degrees and this is exaggerated for the purpose of illustrating the present invention.

The present instrument above described provides a means for obtaining day-by-day training so that the eyes can be trained for many skills such as convergence, divergence, projection, etc.

It is particularly noted that the perpendicular position of the targets to the longitudinal axis of the arms and to each other and the perpendicular position of the mirror relative to the horizontal plane of the arms are most important. Inadvertent vertical displacement of the target holder assemblies must not exceed 2.0 millimeters because misalignment in excess of 2.0 millimeters would introduce an unacceptable amount of vertical deviation and this will affect the normal sensorial relationship once again.

This vision training instrument is also devoid of any lens arrangement and has the targets and mirror disposed so that the patient's eyes can be viewed and are easily accessible for performance of a cover test or other ophthalmic training procedure.

The instrument is clearly unencumbered and only requires proper and accurate alignment of the working parts during the manufacture and during the use of the device.

It will be understood that the invention is not to be limited to the specific construction or arrangement of parts shown but that they may be widely modified within the invention defined by the claims.

What is claimed is:
1. A portable vision training instrument for producing a binocular effect comprising,
    (a) a pair of intersecting support arms disposed perpendicular to each other and having upper surfaces normally lying in a horizontal plane,
    (b) a rotatable target means pivotally connected on each of said arms in planes perpendicular to the horizontal plane of the support arms and at points on the respective arms equidistant from the point of intersection of said support arms,
    (c) a reflector rotatably mounted at the point where said support arms intersect in a plane perpendicular to the horizontal plane of the support arms,
    (d) said reflector disposed on the same side of said support arms as the respective target means and mounted for rotation in an arc having a reference position bisecting the angle formed between the intersecting support arms,
    (e) said reflector sized to enable one of said targets to be viewed directly by one eye and the other of said targets to be viewed by the reflection thereof in said reflector, whereby a stereoscopic effect can be obtained,
    (f) and means alternatively interconnecting said reflector to at least one of said target means to rotate the connected target means proportional to the arc through which said reflector is moved whereby the image viewed by the eye using the reflector is maintained at all times in a plane parallel to that of the target being viewed directly by the other eye.
2. In the combination as claimed in claim 1, wherein,
    (a) each of said target means includes a target holder,
    (b) said target holders providing for interchangeable use of a plurality of targets,
    (c) said targets providing special visual training conditions and coacting with each other at the various angular positions in the arc through which the reflector is rotated.

References Cited by the Examiner
UNITED STATES PATENTS 1,946,925   2/1934   Ames _____ 351—1

References Cited by the Applicant
UNITED STATES PATENTS 871,974   11/1907   Verbeck.
1,650,768   11/1927   Reaves.
1,666,145   4/1928   Reaves.
1,911,963   5/1933   Morrison.
2,704,960   3/1955   Loud.
2,842,027   7/1958   Betti.

DAVID H. RUBIN, *Primary Examiner.*